(12) United States Patent
Juhn

(10) Patent No.: US 9,761,857 B2
(45) Date of Patent: Sep. 12, 2017

(54) ELECTRODE ASSEMBLY FOR SECONDARY BATTERY

(71) Applicant: SK Innovation Co., Ltd., Seoul (KR)

(72) Inventor: Jung Bae Juhn, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 328 days.

(21) Appl. No.: 14/373,053

(22) PCT Filed: Jan. 18, 2013

(86) PCT No.: PCT/KR2013/000426
§ 371 (c)(1),
(2) Date: Jul. 18, 2014

(87) PCT Pub. No.: WO2013/109098
PCT Pub. Date: Jul. 25, 2013

(65) Prior Publication Data
US 2014/0377645 A1  Dec. 25, 2014

(30) Foreign Application Priority Data

Jan. 20, 2012 (KR) .................. 10-2012-0006710

(51) Int. Cl.
*H01M 2/26* (2006.01)
*H01M 2/02* (2006.01)
(Continued)

(52) U.S. Cl.
CPC ............ *H01M 2/26* (2013.01); *H01M 2/021* (2013.01); *H01M 2/0212* (2013.01);
(Continued)

(58) Field of Classification Search
CPC ...................................................... H01M 2/26
See application file for complete search history.

(56) References Cited

U.S. PATENT DOCUMENTS 6,743,546 B1 * 6/2004 Kaneda ............... H01M 2/021
429/127
2009/0317713 A1  12/2009 Kim et al.
(Continued)

FOREIGN PATENT DOCUMENTS

CN  102082256 A  6/2011
CN  102097611 A  6/2011
(Continued)

*Primary Examiner* — Alex Usyatinsky
(74) *Attorney, Agent, or Firm* — The Webb Law Firm

(57) ABSTRACT

Provided is an electrode assembly for a secondary battery, including: one or more first electrode plates: one or more second electrode plates stacked alternately with the first electrode plates; first electrode taps extended from the first electrode plates, respectively; second electrode taps extended from the second electrode plates, respectively; a separator disposed between the first electrode plates and the second electrode plates; and a spacer part formed on lateral surfaces formed in a stacking direction of edges of the first electrode plates and the second electrode plates, so that, by including the spacer part, internal short circuits can be prevented and insertability into a pouch type battery case can be improved, thereby improving stability, reliability, and productivity thereof.

4 Claims, 8 Drawing Sheets

(51) Int. Cl.
*H01M 10/04* (2006.01)
*H01M 10/0585* (2010.01)

(52) U.S. Cl.
CPC ....... *H01M 2/266* (2013.01); *H01M 10/0413* (2013.01); *H01M 10/0436* (2013.01); *H01M 10/0459* (2013.01); *H01M 10/0585* (2013.01); *H01M 2220/20* (2013.01)

(56) References Cited

U.S. PATENT DOCUMENTS

| | | | |
|---|---|---|---|
| 2010/0035144 A1 | 2/2010 | Oh et al. | |
| 2010/0227216 A1* | 9/2010 | Tominaga | H01M 2/0202 429/185 |
| 2011/0129711 A1* | 6/2011 | Ahn | H01M 2/30 429/94 |
| 2011/0143190 A1* | 6/2011 | Cho | H01M 4/622 429/162 |
| 2012/0107681 A1* | 5/2012 | Kogure | H01M 2/00 429/208 |

FOREIGN PATENT DOCUMENTS

| | | | |
|---|---|---|---|
| JP | 2009252392 A | | 10/2009 |
| KR | 100280715 B1 | | 11/2001 |
| KR | 1020090132500 A | | 12/2009 |
| KR | 1020090132925 A | | 12/2009 |
| KR | 1020110039992 A | | 4/2011 |
| WO | WO 2007063857 | * | 6/2007 |

* cited by examiner

[FIG. 1]
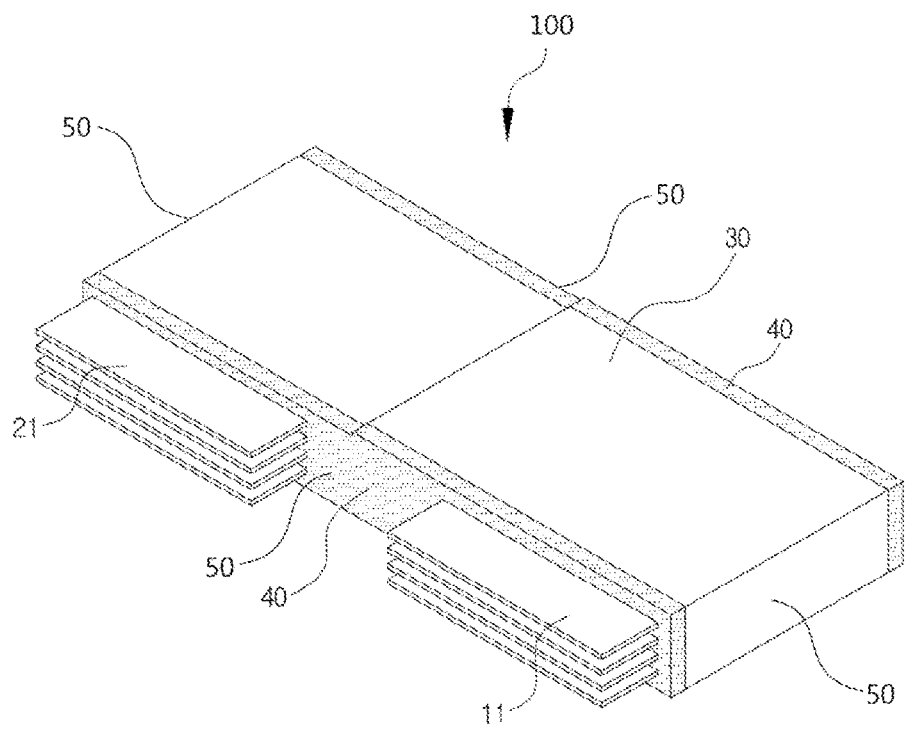

[Fig. 2]
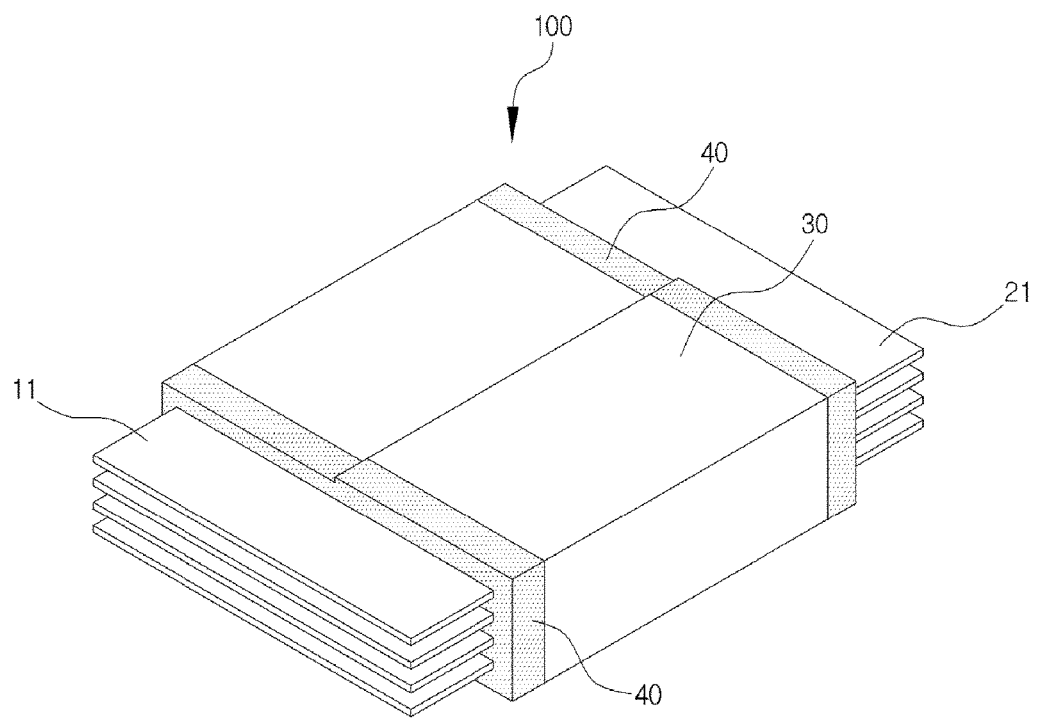

[FIG. 3]
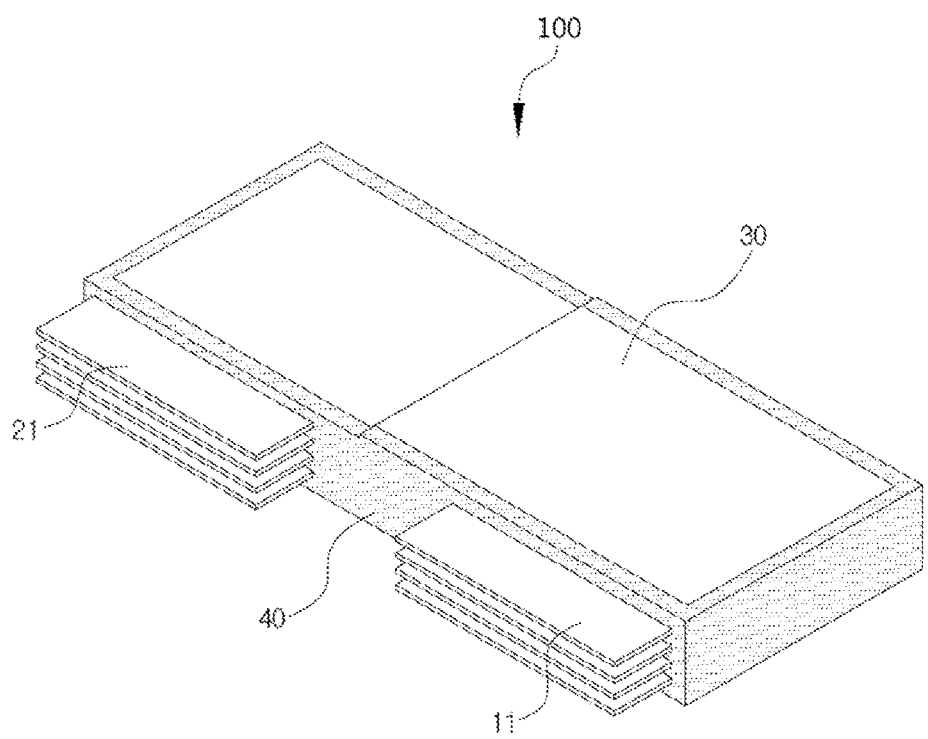

[Fig. 4]
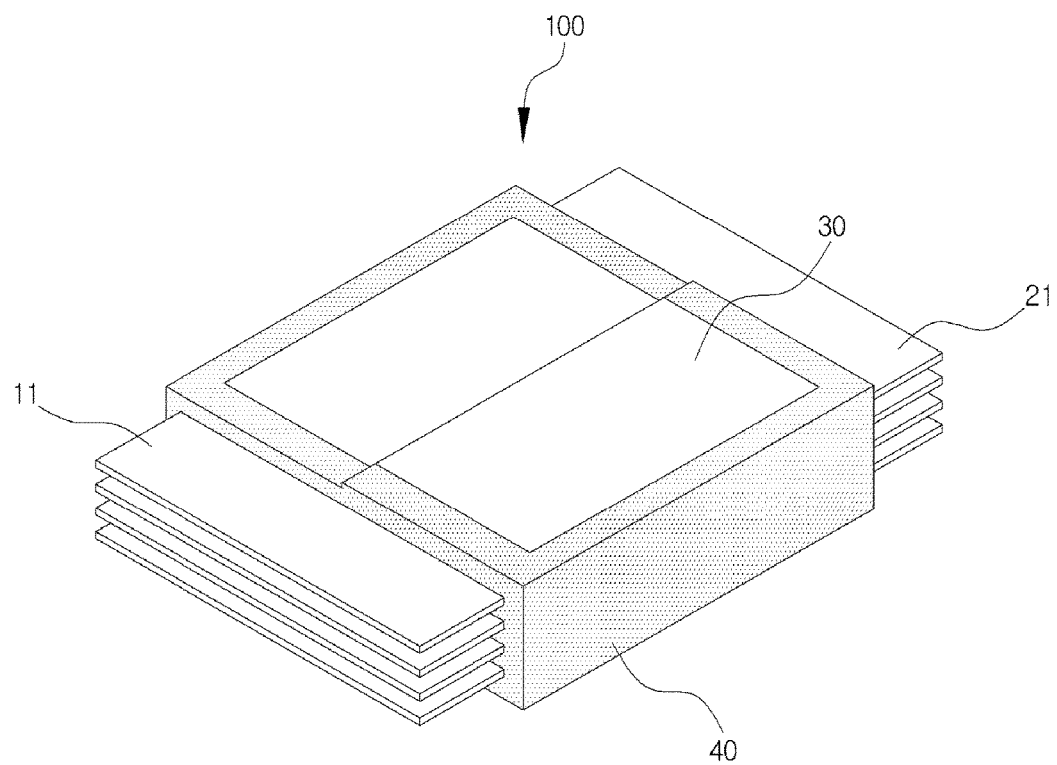

[Fig. 5]
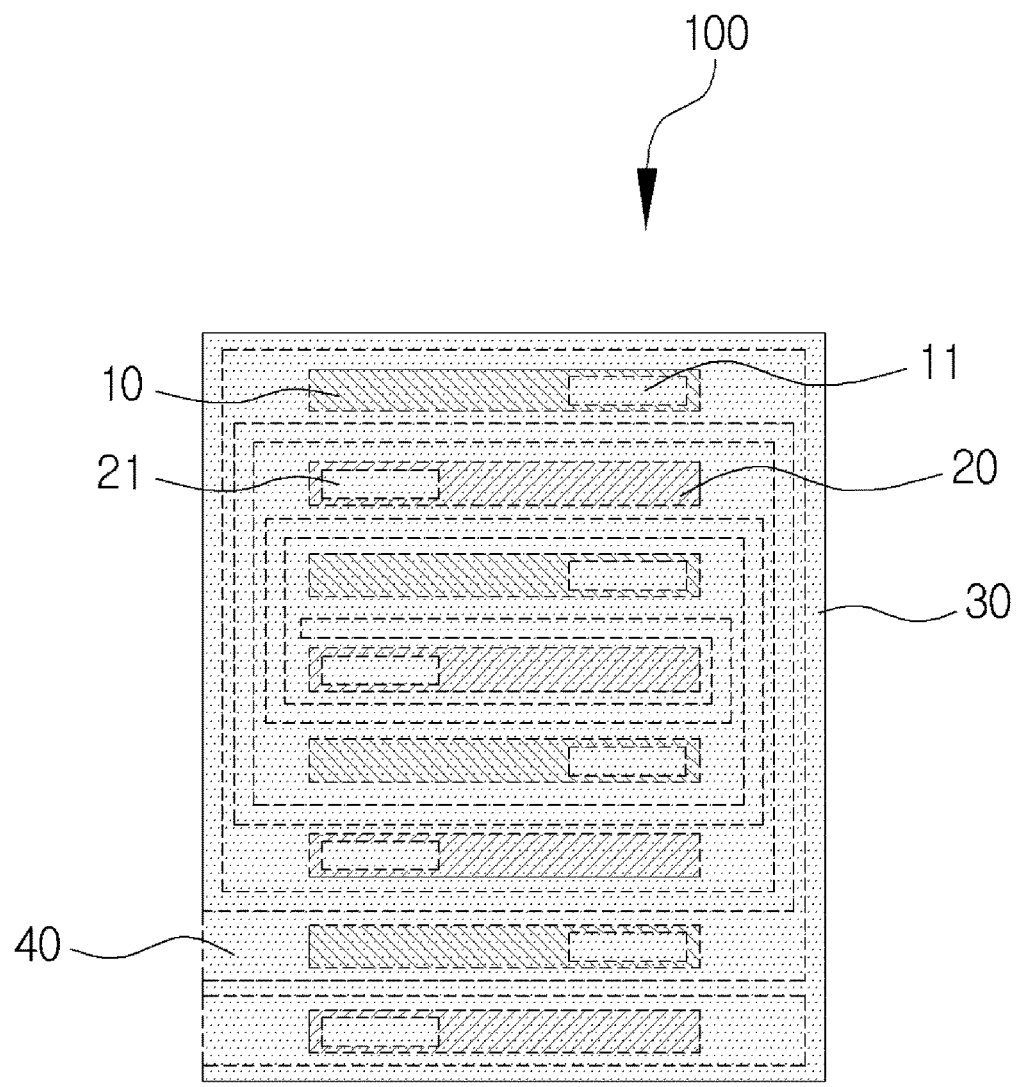

[FIG. 6]
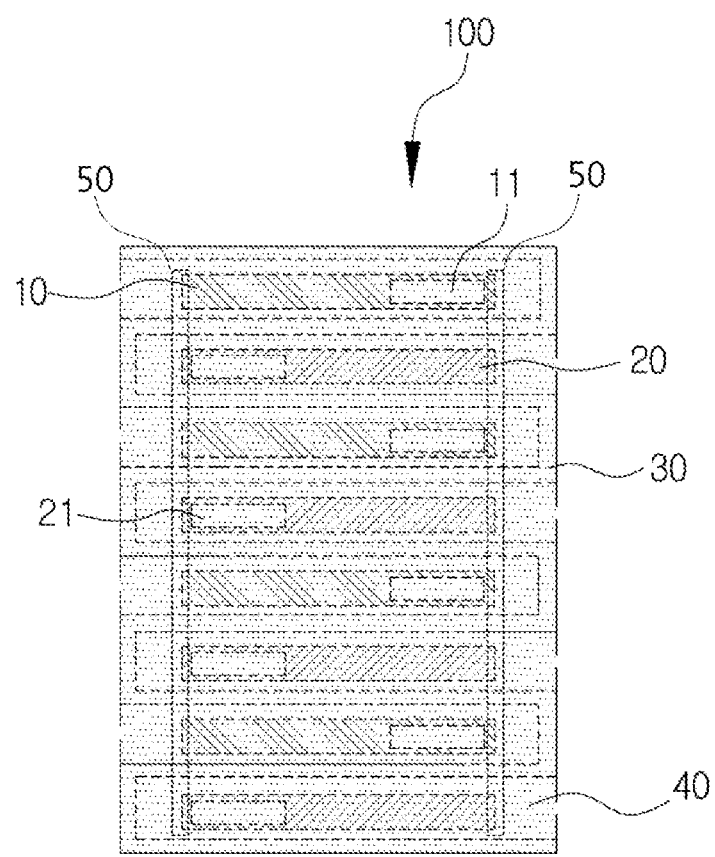

[Fig. 7]
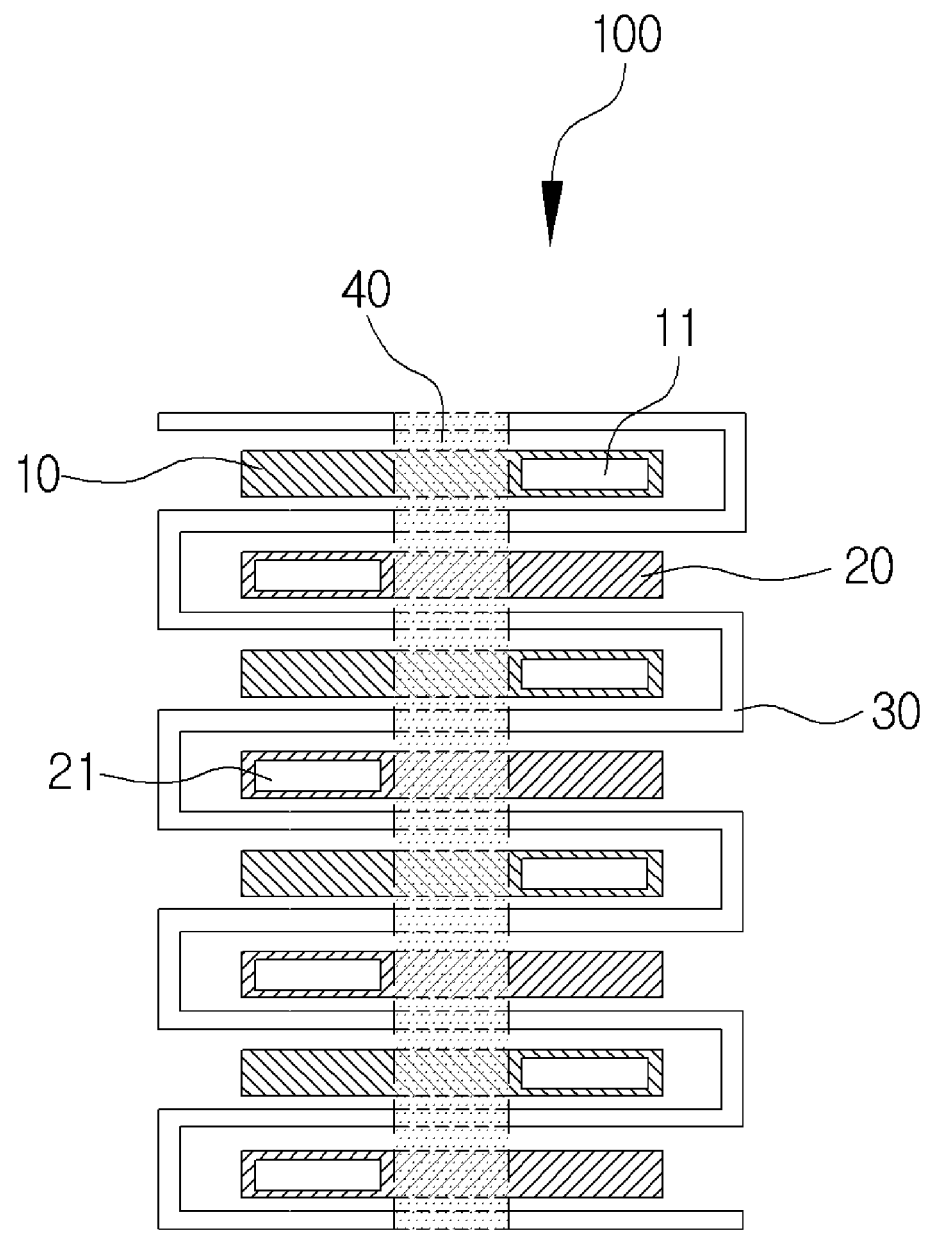

[Fig. 8]
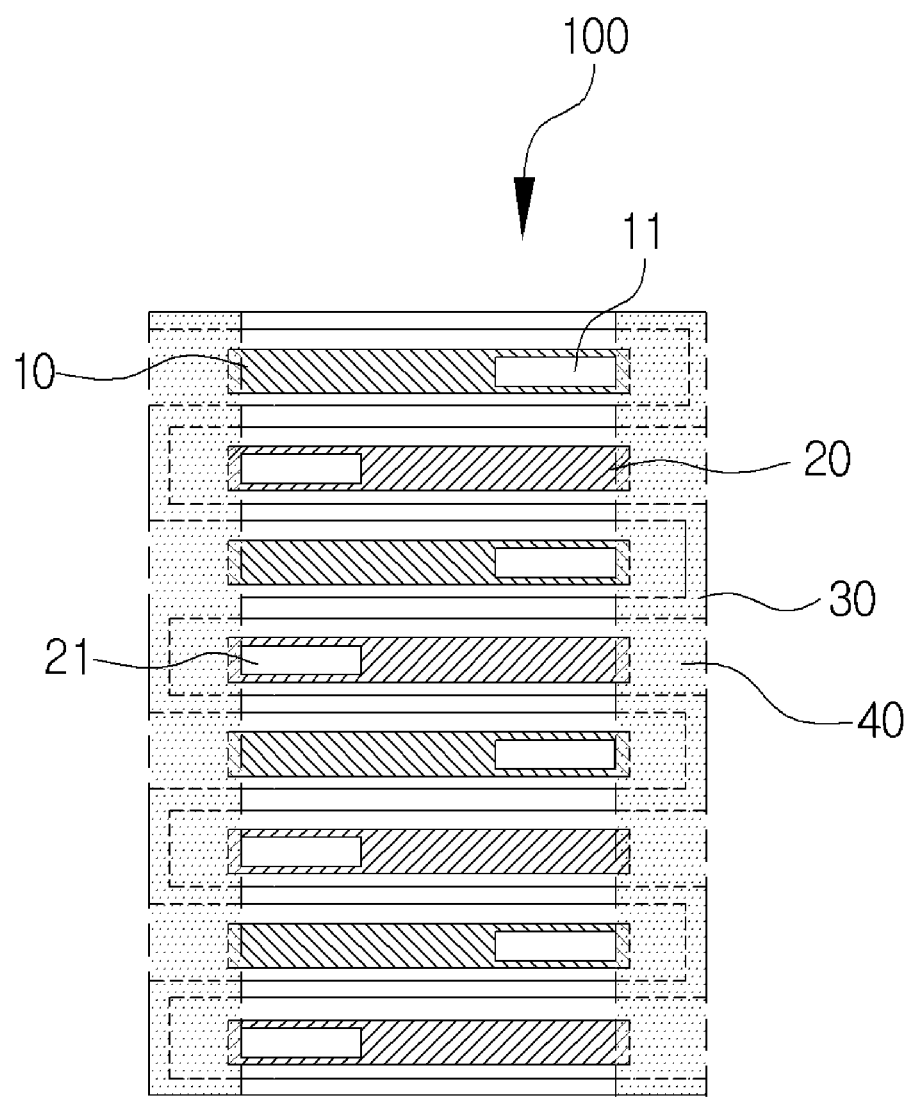

ELECTRODE ASSEMBLY FOR SECONDARY BATTERY

CROSS-REFERENCE TO RELATED APPLICATIONS

This application is the United States national phase of International Application No. PCT/KR2013/000426 filed Jan. 18, 2013, and claims priority to Korean Patent Application No. 10-2012-0006710 filed Jan. 20, 2012, the disclosures of which are hereby incorporated in their entirety by reference.

TECHNICAL FIELD

The present invention relates to an electrode assembly for a secondary battery, and more particularly, to an electrode assembly for a secondary battery, capable of having improved insertability into a pouch type battery case.

BACKGROUND ART

Recently, rechargeable secondary batteries are widely used as energy sources of wireless mobile devices.

In addition, the secondary battery has been prominent as a power source of an electric vehicle (EV), a hybrid electric vehicle (HEV), etc., which have been suggested as a scheme for solving air pollution from an existing gasoline vehicle, diesel vehicle, etc., using fossil fuel.

Small-sized mobile devices use one or more battery cells per one device. In contrast, middle and large-sized devices such as a vehicle, etc., use, as a unit battery, a middle and large-sized battery pack in which a plurality of battery cells are electrically interconnected, due to necessity of high output and large capacity.

The middle and large-sized battery pack is preferably manufactured with, if possible, small size and weight. Therefore, a square type battery, a pouch type battery, or the like, which can be stacked at high integration and have a small ratio of weight to capacitance, is mainly used as a battery cell of the middle and large-sized battery pack. Among them, particularly, the pouch type battery of which weight is small, an electrolyte is less likely to leak, and manufacturing cost is low, is attracting more interest.

A nickel-hydrogen secondary battery has been mostly used as a unit cell (battery cell) of the middle and large-sized battery pack. However, in recent, a lithium secondary battery providing a high ratio of output power to capacitance, like in a small-sized battery pack, is most studied, and some have reached commercialization.

However, the lithium secondary battery has a low stability problem, fundamentally. In particular, the electrode assembly for a secondary battery is problematic with safety thereof due to internal short circuits caused by motion of electrode plates, and a production process to prevent the internal short circuits is not easy.

Accordingly, an electrode assembly for a secondary battery, capable of preventing internal short circuits to improve stability and reliability, providing greater insertability into a pouch type battery case to improve stability and reliability, and growing productivity, is needed.

As described above, technology to prevent internal short circuits due to movement of electrode plates in the electrode assembly for a secondary battery has been known in the related art.

Korean Patent No. 1062681 (Jelly-Roll Type Secondary Battery Characterized by That Substantially Total of Active Material-Non-Coated Portion is Insulated) discloses a secondary battery where an insulation layer is provided on an end of an active-material-non-coated portion, to thereby suppress formation of dendrite and thus prevent breakage or short-circuiting of a separator, resulting in improving stability.

RELATED ART DOCUMENT

Patent Document

Korean Patent No. 1062681 (Aug. 31, 2011)

DISCLOSURE OF INVENTION

Technical Problem

An object of the present invention is to provide an electrode assembly for a secondary battery, capable of preventing internal short circuits and improving insertability into a pouch type battery case, thereby improving stability, reliability, and productivity thereof.

Solution to Problem

In one general aspect, there is provided an electrode assembly for a secondary battery, including: one or more first electrode plates: one or more second electrode plates stacked alternately with the first electrode plates; first electrode taps extended from the first electrode plates, respectively; second electrode taps extended from the second electrode plates, respectively; a separator disposed between the first electrode plates and the second electrode plates; and a spacer part formed on lateral surfaces formed in a stacking direction of edges of the first electrode plates and the second electrode plates.

The spacer part may be formed on one lateral surface where the first electrode taps and the second electrode taps are formed, and the other lateral surface facing one lateral surface where the first electrode taps and the second electrode taps are formed.

The spacer part may be formed on the whole of each of the lateral surfaces formed in a stacking direction of the edges of the first electrode plates and the second electrode plates.

The spacer part may be formed on a center portion or both sides of each of the lateral surfaces formed in a stacking direction of the edges of the first electrode plates and the second electrode plates.

Advantageous Effects of Invention

As set forth above, according to the electrode assembly for a secondary battery of the present invention, the internal short circuits can be prevented and thus stability and reliability can be improved.

Further, the spaces between the first electrode plates and the second electrode plates can be uniformly maintained in the procedure where the electrode assembly for a secondary battery of the present invention is inserted into a pouch type battery case, and thus productivity can be improved.

BRIEF DESCRIPTION OF DRAWINGS

FIG. 1 is a perspective view showing an electrode assembly for a secondary battery according to one embodiment of the present invention;

FIG. 2 is a perspective view showing an electrode assembly for a secondary battery according to another embodiment of the present invention;

FIG. 3 is a perspective view showing the electrode assembly for a secondary battery according to one embodiment of the present invention, including another type of spacer part;

FIG. 4 is a perspective view showing the electrode assembly for a secondary battery according to another embodiment of the present invention, including another type of spacer part;

FIG. 5 is a side view showing the electrode assembly for a secondary battery according to one embodiment of the present invention;

FIG. 6 is a side view showing an electrode assembly for a secondary battery according to still another embodiment of the present invention; and FIG. 7 is side view showing electrode assembly for a secondary battery according to one embodiment of the present invention, including one shape of spacer part.

FIG. 8 is side view showing electrode assembly for a secondary battery of the present invention, including another shape of spacer part.

DETAILED DESCRIPTION OF MAIN ELEMENTS

100: electrode assembly for secondary battery
10: first electrode plate 11: first electrode tap
20: second electrode plate 21: second electrode tap
30: separator 40: spacer part
50: lateral surface

BEST MODE FOR CARRYING OUT THE INVENTION

Hereinafter, electrode assemblies for a secondary battery according to embodiments of the present invention, having the above constitutions, will be described in detail with reference to the accompanying drawings.

FIG. 1 is a perspective view showing an electrode assembly 100 for a secondary battery according to one embodiment of the present invention. The electrode assembly 100 for a secondary battery of the present invention will be described in detail with reference to FIG. 1.

The electrode assembly 100 for a secondary battery according to one embodiment of the present invention, may include: one or more first electrode plates 10: one or more second electrode plates 20 stacked alternately with the first electrode plates 10; first electrode taps 11 extended from the first electrode plates 10, respectively; second electrode taps 21 extended from the second electrode plates 20, respectively; a separator 30 disposed between the first electrode plates 10 and the second electrode plates 20; and a spacer part 40 formed on lateral surfaces 50 formed in a stacking direction of edges of the first electrode plates 10 and the second electrode plates 20.

In the electrode assembly 100 for a secondary battery, when the first electrode plate 10 is a cathode plate, the second electrode plate 20 may be an anode plate. Here, the first electrode tap 11 may be a cathode tap and the second electrode tap 21 may be an anode tap.

The electrode assembly 100 for a secondary battery according to one embodiment of the present invention, as shown in FIG. 1, may have a jelly roll type where the separator 30 is interposed between the first electrode plates 10 and the second electrode plates 20 and then rolled.

However, the electrode assembly 100 according to one embodiment of the present invention may be a stack type electrode assembly 100 where the first electrode plates 10 and the second electrode plates 20 are stacked while the separator 30 is interposed between the first electrode plates 10 and the second electrode plates 20, but is not limited to particular types.

In addition, in the electrode assembly 100 for a secondary battery according to one embodiment of the present invention, the first electrode taps 11 and the second electrode taps 21 may be formed in one direction, as shown in FIG. 1, but the first electrode taps 11 and the second electrode taps 21 may be formed to face each other, as shown in FIG. 2. That is, the direction in which the first electrode taps 11 and the second electrode taps 21 are formed may be various, and is particularly not limited.

In addition, as the sealing member, various materials such as polypropylene and the like may be used.

In addition, the spacer part 40 of each of the electrode assemblies 100 for a secondary battery according to the embodiments of the present invention, as shown in FIG. 1 and FIG. 2, may be formed at one lateral surface 50 where the first electrode taps 11 and the second electrode taps 21 are formed, and the other lateral surface 50 facing to the lateral surface 50 where the first electrode taps 11 and the second electrode taps 21 are formed, but the spacer part 40 may be formed at various positions.

FIG. 3 shows the electrode assembly 100 for a secondary battery according to one embodiment of the present invention, including another type of spacer part 40, where the spacer part 40 is formed at a different position as compared with the electrode assembly 100 where the first electrode taps 11 and the second electrode taps 21 are formed in one direction. As shown in FIG. 3, another type of spacer part 40 as described above may be formed along the whole edges of the first electrode plates 10 and the second electrode plates 20 in a stacking direction of edges thereof.

FIG. 4 shows the electrode assembly 100 for a secondary battery according to another embodiment of the present invention, including another type of spacer part 40, where the spacer part 40 is formed at a different position as compared with the electrode assembly 100 where the first electrode taps 11 and the second electrode taps 21 face each other. As shown in FIG. 4, another type of spacer part 40 as described above may be formed along the whole edges of the first electrode plates 10 and the second electrode plates 20 in a stacking direction of edges thereof.

FIG. 5 is a side view of the electrode assembly 100 according to one embodiment of the present invention. The electrode assembly 100 for a secondary battery according to one embodiment of the present invention includes the spacer part 40, and thus allows the spacer part 40 to support the first electrode plates 10 and the second electrode plates 20, so that spaces between the first electrode plates 10 and the second electrode plates 20 are maintained even during an insertion procedure into a pouch type battery case and regardless of external impact.

FIG. 6 is a side view of an electrode assembly 100 for a secondary battery according to still another embodiment of the present invention. With respect to the electrode assembly 100 for a secondary battery according to still another embodiment of the present invention, a spacer part 40 is formed in an electrode assembly 100 where a separator 30 is folded in a zigzag type.

FIGS. 1 to 6 each show the spacer part 40 formed by coating a sealing member on the whole of each of the lateral surfaces 50 formed in a stacking direction of edges of the first electrode plates and the second electrode plates. However, the spacer part 40 may be formed with various shapes at various positions. FIGS. 7 and 8 are side views showing that spacer parts 40 are formed with various shapes at various positions. The lateral surface 50 includes the side of the edges of the stacked first electrode plates 10 and second electrode plates 20 and the surface of respective electrodes around the edges of the first electrode plates 10 and second electrode plates 20.

FIG. 7 is a side view showing that the spacer part 40 is formed by coating a sealing member on a center portion, not the whole, of each of the lateral surfaces 50 formed in a stacking direction of edges of the first electrode plates 10 and the second electrode plates 20. When the spacer part 40 is formed on the center portion thereof, spaces between the first electrode plates 10 and the second electrode plates 20 can be maintained with the minimum material, and thus, economic feasibility can be improved.

In addition, FIG. 8 is a side view showing that a spacer part 40 is formed by coating a sealing member on both sides of each of the lateral surfaces 50 formed in a stacking direction of edges of the first electrode plates 10 and the second electrode plates 20. When the spacer part 40 is formed on both sides thereof, spaces between the first electrode plates 10 and the second electrode plates 20 can be stably fixed.

Further, the electrode assembly 100 for a secondary battery of the present invention includes the spacer part 40 formed by coating a sealing member on the lateral surfaces 50 formed in a stacking direction of the edges of the first electrode plates 10 and the second electrode plates 20, so that the spaces between the first electrode plates 10 and the second electrode plates 20 can be maintained, thereby preventing internal short circuits and thus improving stability and reliability.

Further, the electrode assembly 100 for a secondary battery of the present invention includes the spacer part 40, so that the spaces between the first electrode plates 10 and the second electrode plates 20 can be uniformly maintained during a procedure where the electrode assembly 100 for a secondary battery is inserted into a pouch type battery case, thereby improving productivity.

The present invention is not limited to the above-mentioned embodiments and an applied range thereof may be various. Also, various modifications of the present invention may be made by those skilled in the art without departing from the gist of the present invention.

The invention claimed is:

1. An electrode assembly for a secondary battery, comprising:
   one or more first electrode plates:
   one or more second electrode plates stacked alternately with the first electrode plates;
   first electrode taps extended from the first electrode plates, respectively;
   second electrode taps extended from the second electrode plates, respectively;
   a separator disposed between the first electrode plates and the second electrode plates; and
   a spacer part integrally formed by coating a sealing memeber on lateral surfaces formed in a stacking direction of edges of the first electrode plates and the second electrode plates.

2. The electrode assembly of claim 1, wherein the spacer part is formed on one lateral surface where the first electrode taps and the second electrode taps are formed, and the other lateral surface facing one lateral surface where the first electrode taps and the second electrode taps are formed.

3. The electrode assembly of claim 2, wherein the spacer part is formed on the whole of each of the lateral surfaces formed in a stacking direction of the edges of the first electrode plates and the second electrode plates.

4. The electrode assembly of claim 2, wherein the spacer part is formed on a center portion or both sides of each of the lateral surfaces formed in a stacking direction of the edges of the first electrode plates and the second electrode plates.

* * * * *